US008612697B2

(12) United States Patent
Massey et al.

(10) Patent No.: US 8,612,697 B2
(45) Date of Patent: Dec. 17, 2013

(54) APPARATUS AND METHOD FOR VIRTUALIZING DATA STORAGE MEDIA, SUCH AS FOR USE IN A DATA STORAGE LIBRARY PROVIDING RESOURCE VIRTUALIZATION

(76) Inventors: Barry Massey, Evergreen, CO (US);
Don Doerner, San Jose, CA (US);
Stephen Moore, Sunnyvale, CA (US);
John Rockenfeller, Lakewood, CO (US); Jeff Leuschner, Rowlett, TX (US); Doug Burling, Plano, TX (US);
Roderick B. Wideman, Parker, CO (US)

( * ) Notice: Subject to any disclaimer, the term of this patent is extended or adjusted under 35 U.S.C. 154(b) by 877 days.

(21) Appl. No.: 12/781,424

(22) Filed: May 17, 2010

(65) Prior Publication Data
US 2010/0228916 A1 Sep. 9, 2010

Related U.S. Application Data

(63) Continuation of application No. 10/947,857, filed on Sep. 22, 2004, now Pat. No. 7,743,205, and a continuation-in-part of application No. 10/738,194, filed on Dec. 17, 2003, now Pat. No. 7,263,596.

(60) Provisional application No. 60/434,268, filed on Dec. 17, 2002, provisional application No. 60/505,307, filed on Sep. 22, 2003, provisional application No. 60/505,308, filed on Sep. 22, 2003.

(51) Int. Cl.
*G06F 12/00* (2006.01)
*G06F 13/00* (2006.01)

(52) U.S. Cl.
USPC ........... 711/158; 711/100; 711/111; 711/154; 711/170

(58) Field of Classification Search
USPC .......................... 711/100, 111, 154, 158, 170
See application file for complete search history.

(56) References Cited

U.S. PATENT DOCUMENTS 6,948,042 B2 * 9/2005 Nagase et al. ................ 711/167
2007/0050569 A1 * 3/2007 Haustein et al. .............. 711/154

* cited by examiner

*Primary Examiner* — Tuan Thai

(57) ABSTRACT

A system and method for use in an automated data storage cartridge library defines cartridges for use with an external host computer ("open" cartridges), and cartridges for use only internal to the library ("closed" cartridges). Cartridges may be "virtualized" by storing data from them on disk or closed cartridges, and then "realized" by writing data to physical cartridges. Virtual cartridges may be logically exported from one library to another. When new cartridges are introduced to the library, they may be designated with one of multiple designations or uses.

6 Claims, 9 Drawing Sheets

Virtual Volume Storage Pool Residence Priority

| Tape ID (bar code) | # Copies | Open/Closed | Virtual Library | Physical Library | Disk/Tape |
|---|---|---|---|---|---|
| HSM927 | 1 | Closed | Library V1 | - | On disk |
| APP244 | 1 | Closed | Library V1 | - | On disk |
| VDD333 | 2 | Closed | Library V2 | | Copy 1 On disk |
| VDD333 | 2 | Closed | Library V2 | Library P2 | Copy 2 On tape |
| BSS245 | 1 | Open | Library V1 | Library P1 | On tape |
| DSS256 | 1 | Closed | Library V1 | | On tape |

*FIG. 9*

APPARATUS AND METHOD FOR VIRTUALIZING DATA STORAGE MEDIA, SUCH AS FOR USE IN A DATA STORAGE LIBRARY PROVIDING RESOURCE VIRTUALIZATION

CROSS-REFERENCE TO RELATED APPLICATIONS

This is a continuation of U.S. patent application Ser. No. 10/947,857 entitled "Apparatus and Method for Virtualizing Data Storage Media, Such as for Use in a Data Storage Library Providing Resource Virtualization," filed Sep. 22, 2004, by Barry MASSEY, et al., and assigned to the present assignee; which is a continuation-in-part of U.S. patent application Ser. No. 10/738,194 entitled "Logical Library Architecture for Data Storage Applications and Methods of Use", filed Dec. 12, 2003 by Rod WIDEMAN, et al., and assigned to the present assignee, now U.S. Pat. No. 7,263,596 which claims priority from U.S. Provisional Application Nos. 60/505,307 entitled "Logical Library Architecture for Data Storage Applications and Methods of Use" filed Sep. 22, 2003; 60/505,308 entitled "Apparatus and Method for Virtualizing Data Storage Media, Such as for Use in a Data Storage Library Providing Resource Virtualization" filed Sep. 22, 2003; and 60/434,268 entitled "Mass Data Storage Library, Such as an Automated Tape Library" filed Dec. 17, 2002.

BACKGROUND

Data storage needs continue to increase and thus the numbers and types of data storage devices are increasing correspondingly. Information technology personnel need methods to manage high-capacity data storage devices, which are sometimes configured as "libraries." These data storage libraries often include a few tape or disk drives and multiple slots to accommodate tape or disk cartridges. A library controller communicates between the host and a robot to control the movement of cartridges between slots and drives.

In some cases, a single host computer exchanges data with a single library. However, it is more common for several computers to communicate with one or more data storage libraries, or to have a data storage library effectively partitioned for use by multiple hosts.

As a result, there is a need to manage these libraries so that each host computer or user is allocated an appropriate amount of storage capacity and drives. One client software product NETBACKUP™, provided by Veritas of Mountain View, Calif., allows multiple computers to share a library. Each user must run a client-side copy of the NETBACKUP™ software, and the software then provides library management capabilities to the users. As an alternative to a client-side software solution, an intermediate software product, such as the SCALAR DLC™ by Advanced Digital Information Corporation of Redmond, Wash., partitions a library into portions so that the library may be shared by users.

A third library management solution is described in U.S. Pat. No. 6,356,803. Under this patent, a multi-path architecture is employed in a system where drives become the interface for the host and the library. Each host is associated with one or more drives, and each drive is then associated with a partitioned set of contiguous slots. The slots are contiguously assigned, with a direct mapping between a partitioned set of slots and a given drive. Other methods of sharing or managing a data storage library may be found in the following U.S. patents/applications: U.S. Pat. Nos. 6,044,442, 6,434,090 , 6,487,474, 6,328,766, and U.S. Pat No. 2001/0034813.

Some of these library management solutions fool applications running on a host computer into thinking that the computer is communicating with a tape drive. Instead, however, a disk drive reads/writes data for the computer and these solutions mimic commands and signals that are typically provided by a tape drive. One product employs a fibre channel (FC) connection between a disk storage facility and an attached tape library. Disk storage is generally more expensive than tape storage, but tends to have a higher quality of service. However, for large data storage needs, a large disk storage pool can be simply too expensive for some end users, and thus they must instead employ more economical tape storage, with its lower quality of service.

BRIEF DESCRIPTION OF THE DRAWINGS

FIG. 9 is a data structure diagram illustrating how tapes in the library are tracked.

Figure 1:
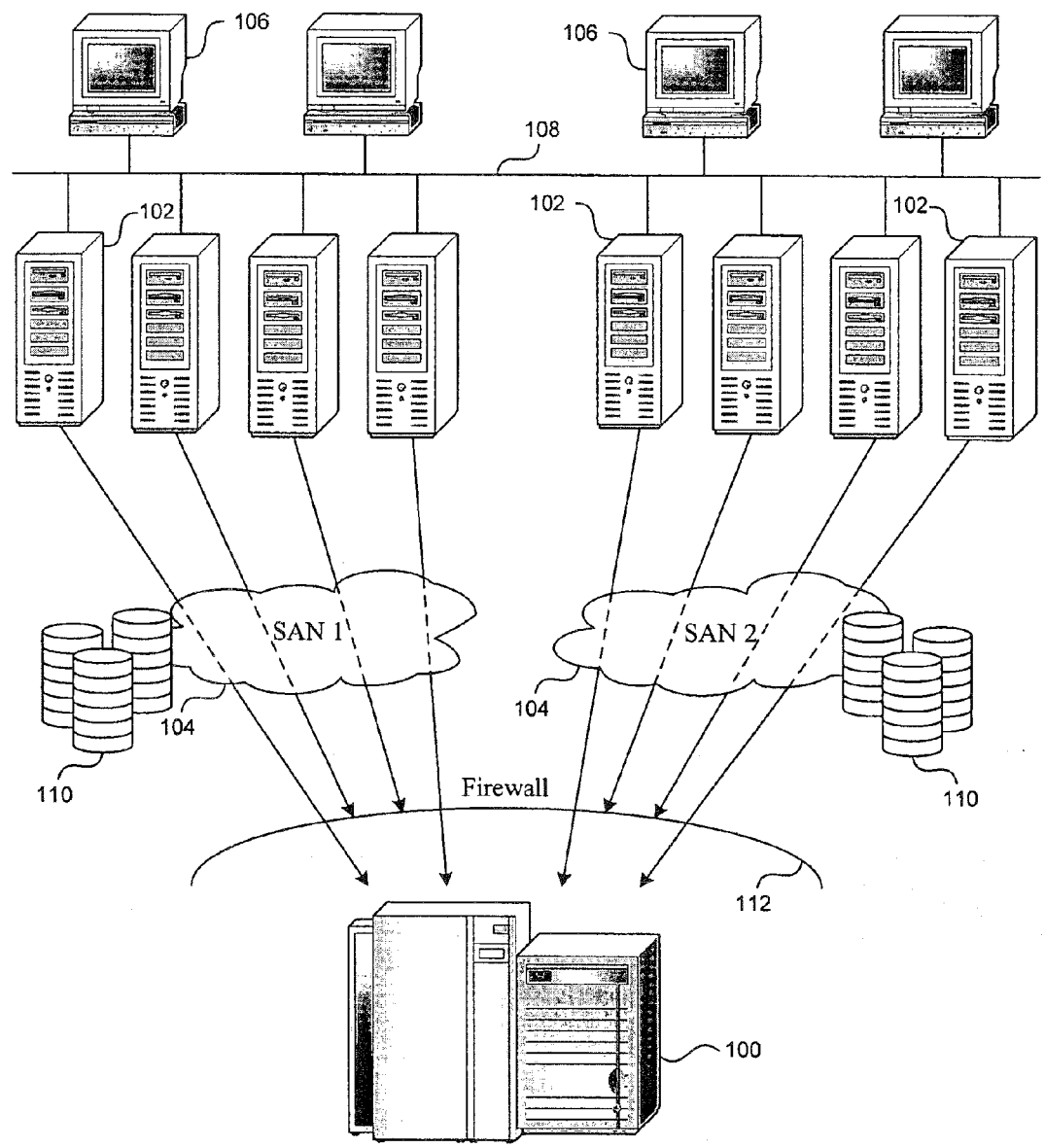
FIG. 1 is a diagram illustrating an example of a library storage architecture employing aspects of the invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 504 is first introduced and discussed with respect to FIG. 5).

The headings provided herein are for convenience only and do not necessarily affect the scope or meaning of the claimed invention.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Overview

Explained below are at least five aspects of the invention. A first provides flexibility to provide "open" or "closed" format tape cartridges or a combination thereof. The "closed" format allows the library to manage storage capacity within the library; this format is for use only by the library and not by an external host computer. However, for portability and compatibility reasons, tapes in open formats are needed, namely a format for use by external computers. Therefore, a virtual cartridge is stored in the closed format as a disk file or on physical tape (e.g. to manage disk space) or both, but it can be readily converted to an open format tape cartridge. The closed format can also provides a different ratio of virtual cartridges to physical media (many on one, one spanning many) than one to one for the open format. A virtual cartridge can have multiple copies for redundancy (e.g., primary copy on disk, second and third copies on closed tape in two different libraries, fourth copy exported in open format for vaulting.)

Under a second aspect, the library or system provides the functionality to provide a tape in the open format, where the data is stored in the closed format on disk. The system can generate an open format physical tape ("realize" a virtual cartridge) concurrently with other activities. Also the system can accept an open format physical tape and convert it to a virtual tape cartridge ("virtualize" a physical tape). The system can provide direct access from the host to a tape cartridge via a tape drive to perform read/write operations, etc.; this functionality can be provided for some tapes and not others as a matter of configuration. It also provides functionality to manage the logical import/export (IE) station separately from the physical IE station to allow external host processing to complete.

A third aspect allows the system to readily determine whether the host requests to simply overwrite a tape, or to read/write some portion of that tape. It doesn't want to spend two hours reading data from tape to disk only to find out that the host simply wanted to overwrite that tape. Therefore, it leaves a "stub" file (i.e., the beginning portion of the closed format disk file) with enough data to trick the host into thinking that the tape has been loaded. If the tape is overwritten, it then simply writes that data to disk. Also, it can manage regions of the virtual cartridge by chunking the closed format disk file and tracking the location on physical tape, thereby allowing the system to quickly locate and copy a chunk from tape to disk. This allows the host to interact with that portion of the closed format disk file while the system retrieves other portions from the physical tape.

A fourth aspect deals simply with the idea of exporting tapes from one logical library and importing them to another. Rather than having to go through the long process of literally writing to tape and then physically exporting a tape to another library, it simply changes the logical library in which the tape resides (without moving the closed format disk file that logically represents the tape).

A fifth aspect deals with providing three options for new media introduced to a library, where that tape can be designated a "blank" tape (i.e. a physical tape containing no data of interest), a tape to be read or written directly, or a tape to be virtualized before being processed. Thus, whenever a new physical cartridge is introduced to the library, the system decides what to do with it based on one of these three options. It provides a protocol and procedures to provide for these three options. Further details regarding aspects of the invention are described below.

In a broad sense, aspects of the invention are directed to a data storage apparatus for allocating removable data storage elements, such as tape or disk cartridges. The apparatus includes means for controlling access to multiple removable data storage elements in the data storage apparatus, including controlling at least an aspect of movement of removable data storage elements to/from data transfer devices, such as tape drives. The data storage apparatus includes non-removable data storage for storing data from the removable data storage elements, where the non-removable data storage has a feature or characteristic, such as reliability, cost, size, or data access performance, that is better than or differs from the removable data storage elements. The apparatus assigns a first set of removable data storage elements as being in a format compatible for use by an external computer, while a second set are assigned as being not in a format for use by the external computer, but to supplement the memory capacity of the non-removable data storage.

When a new data storage element or cartridge is introduced to the system, the system may designate it as a new blank cartridge to be used by the computer or library. Secondly, the new cartridge can be made available for direct access by the external or host computer. Alternatively, the new cartridge can be used as a virtualized cartridge wherein data from the new cartridge is stored on the non-removable data storage. The computer accesses data on the non-removable data storage, and believes it is interacting directly with the data storage cartridge, but instead the library provides signals to fool or spoof such interaction.

Under another aspect of the invention, two or more virtual data storage libraries may be established, wherein physical data storage resources of the first and second data storage libraries are respectively represented by data logically defining physical data storage resources of each data storage library. A virtualized data storage cartridge is logically associated with the first virtual library and includes cartridge data from a physical cartridge assigned to the first data storage library, where this cartridge data is stored on the non-removable data storage. After receiving a request to export the physical data storage cartridge from the first to the second library, the system switches the logical association of the virtualized data storage cartridge from the first to the second virtual library without exchanging the cartridge data between the first and second virtual libraries.

Under another aspect of the invention, the library stores data associated with a cartridge on the non-removable data storage, or otherwise "virtualizes" the cartridge. After receiving a request to export the cartridge, the library retrieves a cartridge, writes the data from the non-removable data storage to the cartridge, and exports that cartridge. The library may indicate to the host computer that the tape has been exported, when in fact the process of exporting that tape has only just begun.

In yet another aspect of the invention, the system stores a portion of the beginning of data stored on each of multiple data storage cartridges on the non-removable data storage. Upon receiving a request from the host computer for one of the cartridges, the library provides the stored data portion. If the library determines that the host computer wishes to overwrite the cartridge with new data, the library stores the new data on the non-removable data storage, rather than writing data from the cartridge onto the non-removable data storage, the library designates the cartridge as blank and for general use by the computer or library.

System Configuration

One suitable system implementing aspects of the invention is shown in FIG. 1. Unless described otherwise herein, the blocks depicted in FIG. 1 and the other figures are well known or described in detail in the above cross-referenced provisional patent application. Indeed, much of the detailed description provided herein is explicitly disclosed in the provisional patent application; much of the additional material of aspects of the invention will be recognized by those skilled in the relevant art as being inherent in the detailed description provided in such provisional patent application, or well known to those skilled in the relevant art. Those skilled in the relevant art can implement aspects of the invention based on the detailed description provided in the provisional patent application.

Referring to FIG. 1, a removable data storage library 100 is coupled to one or more host computers 102 by way of one or more storage area networks (SANs) 104. The host computers or "hosts" are coupled to one or more client or user computers 106 by way of a bus 108 or other computer network. The hosts 102 may also be coupled to additional data storage 110 by way of the one or more SANs 104. A firewall 112 may protect the library 100 from malicious attacks.

As explained below, a library management layer or unit, interposed between physical elements of the library 100 and the hosts 102, acts as though each of the hosts is physically attached to one or more storage resources, such as tape drives, disk drives, and the like, as well as associated removable media, such as tape or disk cartridges. The library managing unit may run or exist within the library 100, or be a separate unit or node between the library 100 and the hosts 102. While tape drives and tape cartridges are generally discussed below, those skilled in the relevant art will readily recognize that the term "data storage resource," "removable media data storage device" and similar terms refer to any data storage device, such as disk drives (optical, magnetic, etc.), hard disk drives, semiconductor memory, photonic memory, electron spin memory, organic/protein/nucleic-based memory, nanotechnology-based memory, and so forth. While multiple physical hosts are shown on FIG. 1, a single physical host computer may be employed partitioned into multiple logical hosts. Likewise, while the configuration in FIG. 1 shows multiple host computers 102 coupled to each other, and to each of multiple client computers 106, numerous computer architectures may be employed. Further, aspects of the invention may apply more specifically to applications running on the host computers.

FIG. 1 provides only a brief, general description of a suitable computing environment in which aspects of the invention can be implemented. Although not required, aspects of the invention are described in the general context of computer-executable instructions, such as routines executed by a data computing platform associated with the library 100, although a general-purpose computer, e.g., a server computer, wireless device or personal computer may be employed. Those skilled in the relevant art will appreciate that certain aspects of the invention can be practiced with other communications, data processing or computer system configurations, including: Internet appliances, hand-held devices (including personal digital assistants (PDAs)), wearable computers, all manner of cellular or mobile phones, multiprocessor systems, microprocessor-based or programmable consumer electronics, set-top boxes, network PCs, minicomputers, mainframe computers and the like. Indeed, the terms "computer", "host" and "host computer" are generally used interchangeably, and refer to any of the above devices and systems, as well as any data processor. Aspects of the invention can be embodied in a special purpose computer or data processor that is specifically programmed, configured or constructed to perform one or more of the computer-executable instructions explained in detail herein. Aspects of the invention can also be practiced in distributed computing environments where tasks or modules are performed by remote processing devices, which are linked through a communications link. In a distributed computing environment, program modules may be located in both local and remote memory storage devices.

Aspects of the invention may be stored or distributed on computer-readable media, including magnetically or optically readable computer discs, as microcode in semiconductor memory, nanotechnology memory, or other portable data storage medium. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.), or may be provided over any analog or digital network (packet switched, circuit switched or other scheme).

Figure 2:
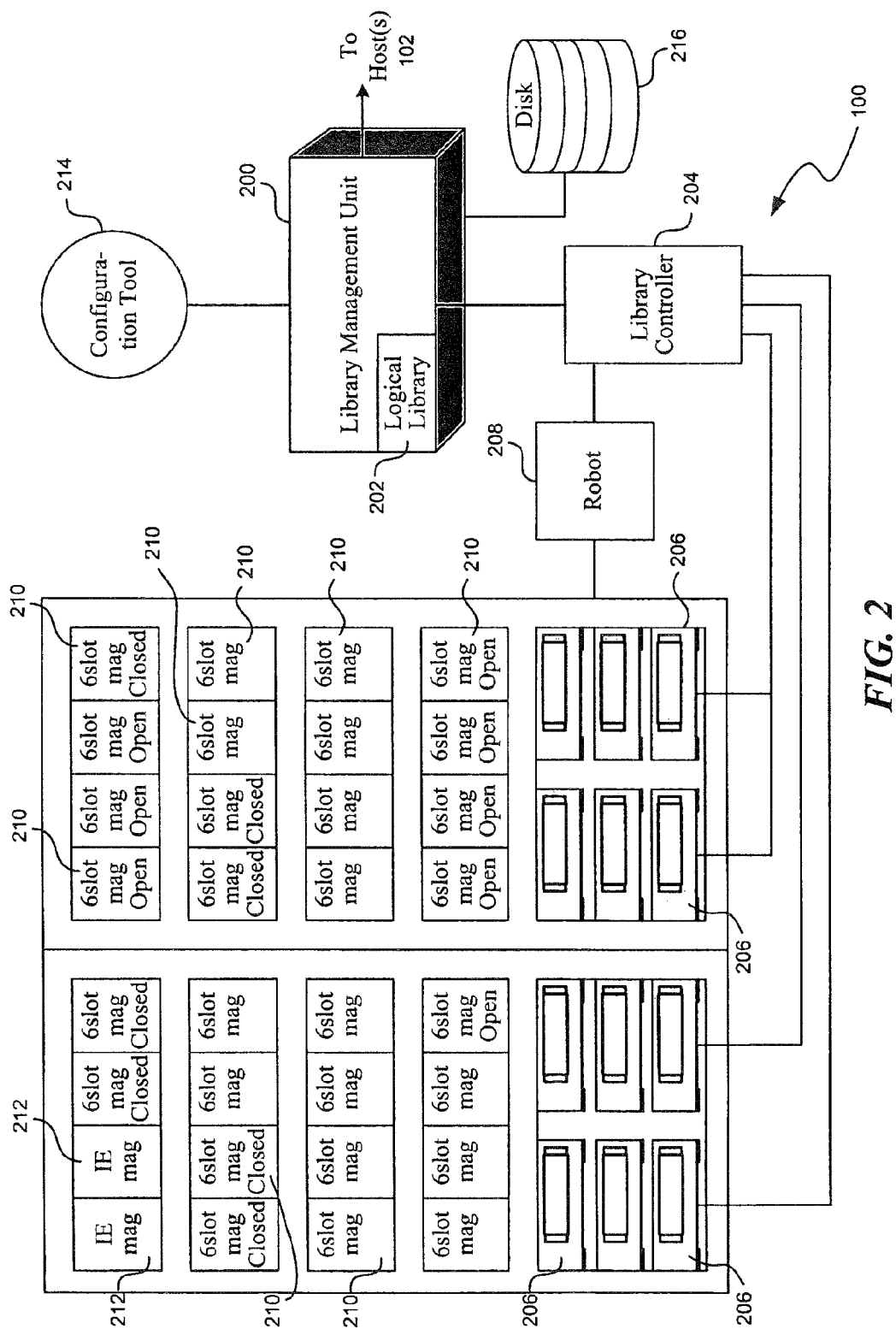
FIG. 2 is a block diagram illustrating a library configured by a library management unit as a single logical or virtual library.

Referring to FIG. 2, the library 100 is shown as having a library management unit 200 that defines and employs logical or virtual libraries 202. The library management unit 200 is interposed between the host computers 102 and a library controller 204. (Alternatively, the library management unit 200 could be combined with the library controller 204 as a physical unit, and just logically separated.) The library controller 204 controls data storage drives 206 (such as tape drives, disk drives, and other data storage devices described herein). The library controller 204 also controls a robot 208 that moves data storage media, such as tape or disk cartridges, between data storage slots 210 and the drives 206. Import/export slots 212 allow cartridges or media to be introduced or removed from the library (sometimes known as a "mailbox"). Slots may be represented individually, or in groupings, such as a segment containing six slots; likewise, import/export slots may be grouped into a multiple slot segment. A configuration tool 214 allows a system administrator or other user to create or reconfigure the logical libraries 202.

While the term "library" is used, the term "media changer" is more common within the Small Computer System Interface (SCSI) domain. Such a media changer includes four elements, namely: a media transport element, which is a robotic piece that shuttles removable media throughout a device; a storage element, which is a static storage location for removable media (e.g., a slot); a data transfer element, which is a read/write device for removable media (e.g., a drive), and an import/export element, which permits removable media to be introduced or removed from the media changer.

The interface for the logical library unit 200 may be performed in a variety of ways. A simple approach is to simply attach both the logical library unit and the drives 206 to a host 102 by way of a SCSI Parallel Interface (SPI). Multiple hosts may be connected with multiple SCSI ports. A Fibre Channel (FC) or Gigabit Ethernet (GE) interface may be used between the hosts 102 and the library management unit 200. The drives 206 may be coupled to the host by way of parallel SCSI connections or by FC connections if FC drives are employed.

The library management unit 200 is also coupled to cache memory 216, which may be any variety of hard disk configurations (e.g., RAID) as well as solid state/semiconductor memory, etc. Such disk memory 216 may have better reliability, cost, size, data access performance, or other criteria than the disk or tape memory. However, in some applications, the disk cache may simply have different features or characteristics from the tape or cartridge memory. (While the terms "disk memory," "disk cache," and "disk" are generally used interchangeably below, those skilled in the art will recognize that any non-removable memory may be employed.)

As described in detail herein, a library or system manages data through an interplay of storage pools and data management policies. The storage pools are sets of storage resources, each characterized by: (1) a particular storage capacity; (2) a uniform normalized cost and quality of service (reliability, performance, or other); and (3) a specific location. An important attribute of a storage pool is whether a virtual device can directly access it, as described herein. Generally, the following description describes an example of two storage pools, one or more tape cartridge libraries, and a disk cache. However, other storage pools may of course be employed.

The data management policy, also described in detail below, is a set of timed and/or event-driven replications (i.e., copying of data from one storage pool to another) and eligibility for deletion from a particular storage pool. These policies are applied to a piece of data (e.g., a virtual tape volume). The data management policies control the location of data under control of that policy over time from when the data is acquired through disposal of that data.

Figure 3:
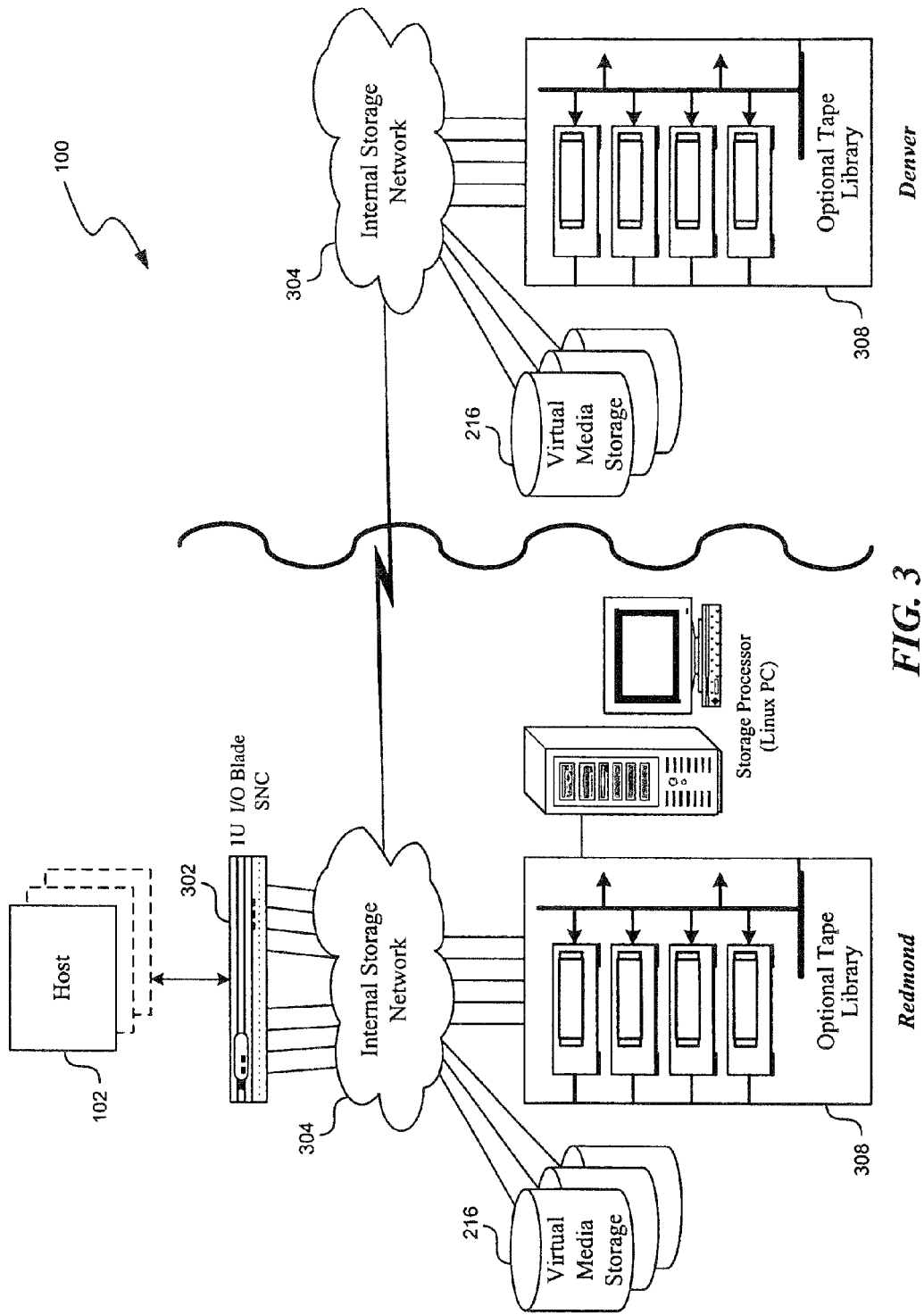
FIG. 3 is a block diagram illustrating an example of an alternative library employing physical data storage resources in two geographical locations.

FIG. 3 shows an example of such a system. One or more host computers communicate with an input/output blade 302, such as the storage network controller blade provided by Advanced Digital Information Corporation of Redmond, Wash. As shown, two internal storage networks 304 are connected by a high bandwidth communications link 306, where at least one of these networks exchanges data with the I/O blade 302. Each internal storage network (and associated components) may be geographically separated, and connected only by the communication link 306.

Each internal storage network 304 interconnects the library management unit or storage processor 200 (such as a personal computer running Linux) with the disk cache 216, which operates as virtual media storage, as described herein. Each location may also include one or more tape libraries 308, which include drives, tape cartridges, tape slots, robot, and other components noted above.

The libraries of FIGS. 2 and 3 (i.e., data storage architectures) may be realized where nearly all aspects of the physical data storage library are virtualized, or represented by blocks of code, files or data structures. Under a system 400 of FIG. 4, a collection of storage resources are provided to the host 102 as a pool of logical proxy elements 420. In other words, the logical proxy elements are handles for the host 102 that represent or organize pools of physical and virtual data storage resources 401 and 403. The library management layer 200 coordinates or manages whether a request from the host is to be routed either to one or more of the physical data storage resources in the physical resource pool 401, or to an emulated resource from the pool of virtual data storage resources 403. Based on a given host command, the library management layer 200 may provide from the pool 401 a particular piece of media 402 (e.g., a particular tape cartridge), the media changer/robot 204, or one of the I/E slots 212, storage slots 210, or data transfer devices/disk drives 206. Alternatively, the library management layer may provide an emulation or virtualization of such physical resources, such as virtualized media 403, virtualized media changer 404, virtualized data transfer devices 406, virtualized storage slots 410, or virtualized I/E slots 412 (all of which form the virtualized resource pool 403).

Data virtualization under this architecture includes a data structure or subroutine, running on a computer or data processor associated with the library, that emulates a given data storage element (not only drives or import/export slots, but also media). In other words, the library management layer 200 provides the host 102 with the logical proxy pool 420, which includes logical media proxies 422, a logical proxy media changer 424, logical data transfer device proxies 426, logical storage slot proxies 430 and logical I/E slot proxies 432, each represented by a subroutine, file or data structure. The library management layer 200 governs the association of elements in the logical proxy pool 420 with either physical or virtual resources 401 or 403, dynamically or statically. In other words, the management layer 200 decides in advance, or in real time, how to respond to requests from the host— whether to map a request to either one of the physical data storage elements 401, or to one of the virtual data storage resources 403. An external application on the host 102 may rarely use a physical or virtual resource directly; instead, the external host application may only employ or interact with the proxy, which in turn uses the physical or virtual resource. (Alternatively, the external application may employ a proxy, e.g., a proxy for a drive, which then selects a drive from the pool (via the library management layer)—the host application directly uses that physical resource, although through the proxy the system may make the selected drive appear as any particular drive for the host.)

The library management layer 200 may associate one or more logical data storage proxy elements 420 with one or more physical resources in the physical resource pool 401. For example, after the library management layer received an Inquiry command, the library management layer may then receive from the host a specific media request, such as a mount media command.

Figure 4:
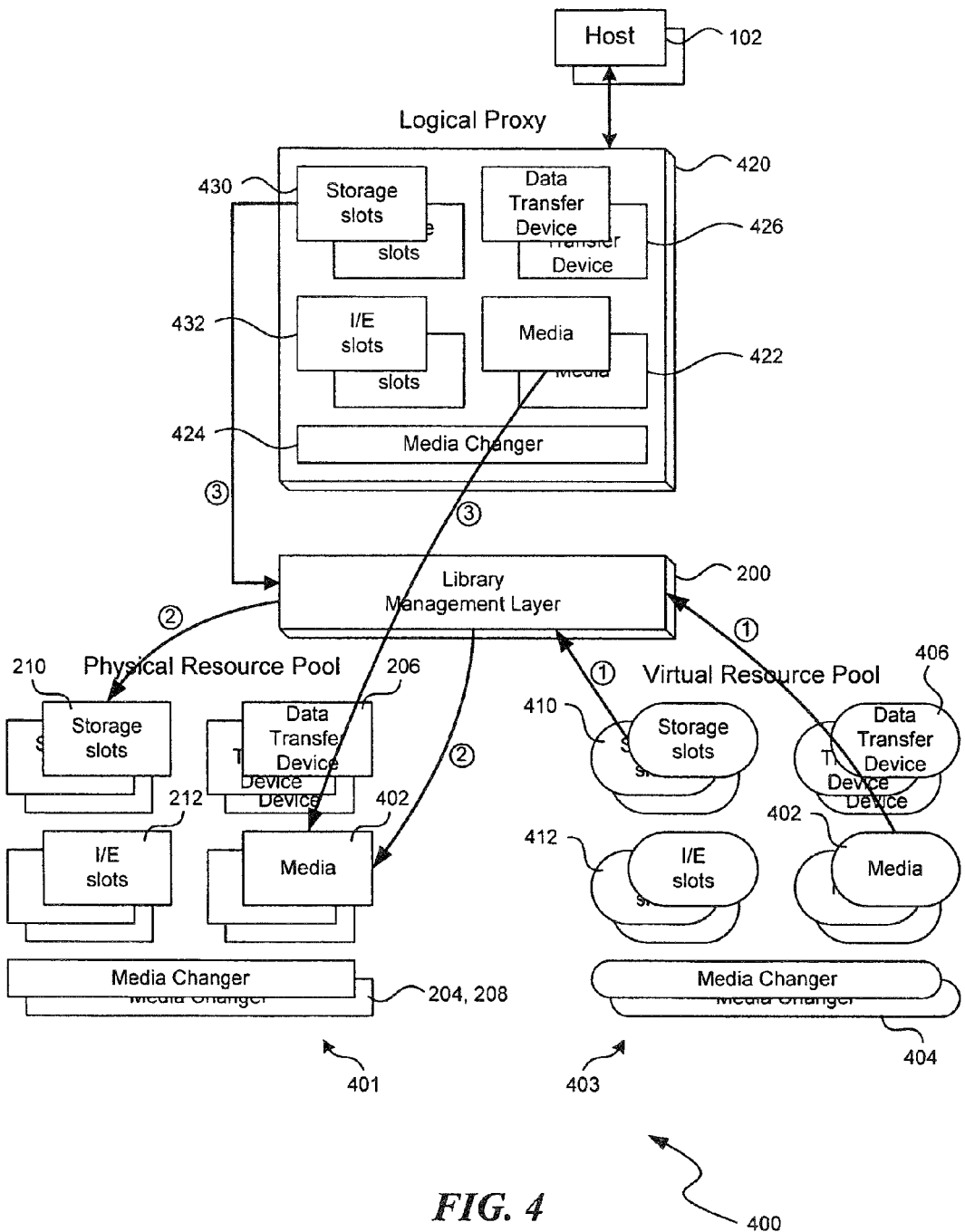
FIG. 4 is a block diagram of an example of associating physical data storage resources for logical proxy resources under a virtualized storage architecture.

Under the example of FIG. 4, the library management layer 200 is not involved with certain specific media (as shown by the arrow bypassing the library management layer, and pointing directly to the media 402). Instead, the host has direct access to a particular physical media (cartridge) 402 (in response to the host command). There is no proxy for the media, but the physical media is directly associated with the collection of other logical proxies (slots, drives, media changer). While shown in FIG. 4 as two separate blocks, the media in the logical proxy group 420 and the physical resource pool 401 is the same (and thus has the same reference number 402).

Alternatively, a logical proxy for the media is provided. The library management layer 200 may still provide direct access between the logical proxy of a particular media element 422 and the associated physical media (cartridge) 402, in response to the host command (which includes the logical media proxy).

In response to the host command associated with the logical media changer proxy 424, the library management layer 200 does commit the physical media changer 204. In response to the logical storage slot proxy 430 (associated with the host command), the library management layer maps to the appropriate storage slot 210 associated with the specifically requested media cartridge 402. In response to the data transfer device logical proxy 426, the library management layer simply selects one of the data transfer devices 206.

An example of how a virtualized library maps virtual data storage resources to virtual resources is as follows. The library management layer 200 provides to one or more host computers 102 logical proxies for physical data storage resources in the library. The library management layer may then, in response to commands received from the host, determine whether to provide physical data storage resources, or virtual resources. In the example shown, the library management layer has provided a set of logical proxies to the host, and in response to a previous command, provided emulated or virtual resources. However, in response to a current command, physical data storage resources must be provided.

Thus, the library management layer 200 transfers and converts virtual resources, including media and storage slot resources, into physical media and physical storage slot resources. Thus, as shown by arrows "1," virtual media and storage slots are remapped by the library management layer into physical media and storage slots (represented by arrows "2"). Then, as represented by arrows "3," the library management layer associates the logical proxies with the now identified physical resources.

Open/Closed Format

Importantly, cartridges in one or more data libraries 308 may be designated as being "open" or "closed." Open cartridges refer to those in a format for use by the host 102. Conversely, the closed cartridges are formatted so that they may not be used by the host, but instead are used internally by the library 100. Such closed format cartridges are used only for backup for the disk cache 216 to effectively extend the capacity of the library 100 so that its high-quality of service capacity represents the capacity of the disk cache 216 as well as that of the closed format cartridges. Closed format tapes form a storage pool that is not directly accessible by virtual devices in the library (as described below), but offers a fairly low quality of service (being automated tape) and it is much more economical than disk because multiple, partially-filled virtual volumes may be "stacked" on a single physical volume or cartridge. The library employs a simple process to allocate two or more volumes of data from the disk cache (virtual tape volumes) to closed tape cartridges in an attempt to fill each closed tape to its capacity. As a result, the library can have a capacity that is an order of magnitude or larger than the disk cache 216.

The library management unit simply maintains a table indicating which tapes (e.g., by bar code designation) are closed, versus which ones are open. These closed tapes are dedicated to managed data, while the open tapes are dedicated to native data for use by the host computers. The customer can modify this table by determining how many tapes in the library to allocate as closed tapes, through the configuration tool 214. A third set of tapes may be employed that are dedicated to the internal system backup and are not usable by the customer. (Such closed format cartridges may have a barcode or other designation, but they are generally used only within the library to permit the library management unit to write data from the disk 216 to such closed cartridges.)

If data resides on a closed tape, and the library receives an export command to export a cartridge, then the data can be read from the closed tape to create an open tape. (This may be done by first writing the data to disk 216, and then to an open format tape, or directly from a closed to an open format tape.) Note that the terms "cartridge" and "tape" are generally used interchangeably herein, but refer to all types of removable data storage media.

FIG. 9 shows an example of a table employed by the library to track tapes. The first column identifies each tape in the library by some designation, such as barcode label. (While only several tapes are shown, the library may include many more.) The second column indicates the number of copies of the tape. The third column indicates whether the tape is open or closed. The fourth column indicates which virtual library the tape is associated with. The fifth column indicates any physical library the tape is associated with. The sixth column indicates a location of the tape, whether the data resides only on the tape, whether it has been copied to disk ("virtualized") or to tape, and so forth. As shown, the tape "BSS245" is an open tape associated with virtual library V1 and physical library P1, and resides only on tape.

As described in greater detail below, the library provides an Entry Policy for new media introduced to the library. The Entry Policy associated with a newly-entered tape can take any of three values: the tape can be designated a "blank" tape (i.e. a physical tape containing no data of interest), a "direct access" tape (i.e. a tape to be read or written directly), or the tape can be virtualized before being processed. Thus, whenever a new physical cartridge is introduced to the library, the system decides what to do with it based on one of these three options. It provides a protocol and procedures to provide for these three options.

The disk cache 216 operates as a working space to store data to provide a high quality of service to the host computer 102. Policies are necessary to maintain free working space on the disk cache 216. Thus, a goal is to maintain a set of delete or truncate candidates equal to an amount of free working space required by the library. This permits the library to react quickly and free disk space to allow, for example, a backup job to complete.

To this end the library management unit 200 continually employs two policies: Store and Truncate. The Store policy is a process whereby the library management unit continually scans the disk cache 216 for volumes or data to be copied to closed format tapes. In so doing, the library management unit creates a candidate list of data to be so copied under the Store policy. To preserve system performance, such as during peak load periods, the Store policy may be halted or otherwise have blackout periods.

The Truncate policy represents a process whereby the library management unit is triggered by the disk space crossing a threshold level (e.g., 85%). When the threshold is reached, the Truncate process initiates and identifies the candidate list generated under the Store policy for data to delete or overwrite to thereby free up disk space. Data on the disk 216 can only be overwritten if it has already been copied to a closed format tape or otherwise duplicated.

In general, the system employs a least-recently-used algorithm to determine what data to move from disk to closed tape. (The terms "system" and "library" are generally used interchangeably herein unless the context requires otherwise.) The library employs or associates data management policies to virtual tape volumes stored on the disk cache 216 in several ways, such as explicitly or implicitly. Data management policies can be associated with virtual tape volumes explicitly through a management interface (the configuration tool 214), or through an out-of-band communication mechanism accessible by the host 102. Data management policies may also implicitly be associated with virtual tape volumes by virtue of being associated with a particular virtual library, or by virtue of having been written by a particular virtual tape drive. There is no priority amongst such; the last association of data management policy to virtual tape volume takes precedence. Overall, the ways of categorizing a value of data on the disk 216 may be employed, such as data staying on disk for a specific period of time (8, 15 or 32 days), data always staying on disk, data immediately moving to tape, or policies to find the most cost-effective place for data.

Disk-based storage pools are expensive and limited in capacity as compared with the total volume of data to be managed in the library. Thus, use of the capacity on the disk cache 216 is to be prioritized so as to decide what data is to remain on disk at an arbitrary point in time. Of course, a virtual tape or volume is removed from disk only if it has been stored elsewhere.

Figure 8:
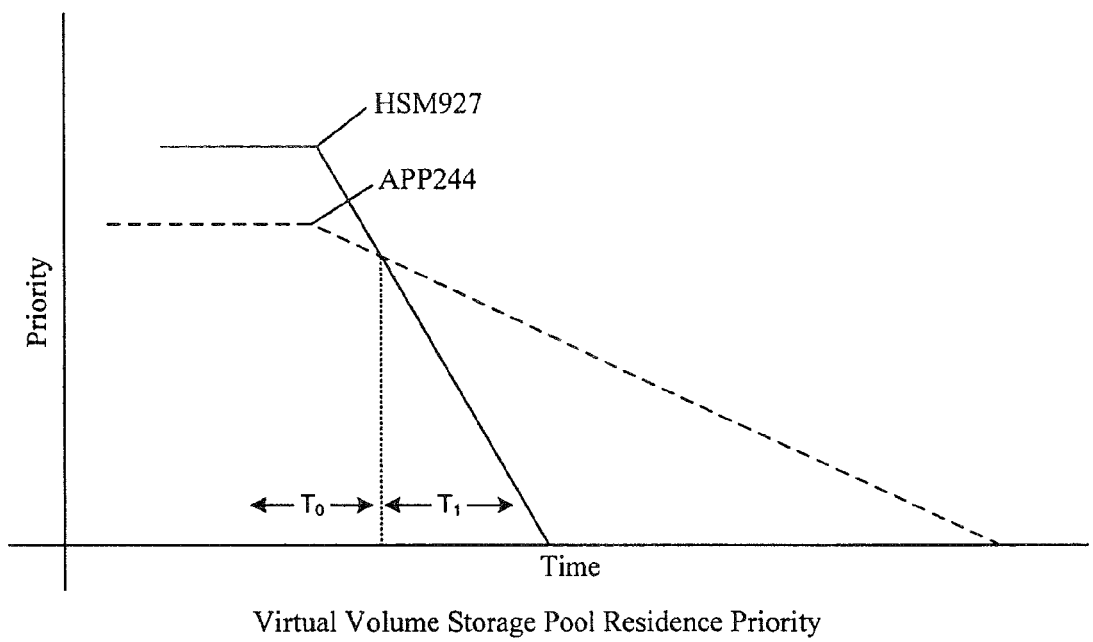
FIG. 8 is a graph showing an example of a caching priority.

As noted above, a simple data management scheme for the disk 216 is to treat all data as equal and delete the oldest first. An improvement to this is to associate priorities to data, so that lower priority data is deleted before higher priority data. However, as shown in FIG. 8, a more sophisticated solution applies priorities to data that change over time, whereby data of high priority may have its priority decay rapidly as opposed to data that has a lower priority, but which remains at that level for a greater period of time. As shown in FIG. 8, a tape cartridge having barcode label HSM927 has greater priority during time interval $T_0$ than a tape cartridge APP244. However, as shown in FIG. 8, the priority of HSM927 decays rapidly, so that during interval $T_1$, the cartridge APP244 assumes a greater priority.

To accomplish this, each virtual volume is assigned a time-dependent residence priority defined by three parameters. Initially, an Initial Residence Priority determines a value of a volume's priority (which represents a height of the "flat part" of the curve). A first parameter, a Volume Cool-Off Period, determines how long (in hours) the virtual tape volume remains inactive before being copied to a subsequent storage pool under the data management policy (e.g., copied to tape). After this cool-off period expires, the virtual tape volume may be migrated at the convenience of the library, and expiration can be triggered based on the time since the data was last modified.

A second parameter, a Volume Lockdown Period, determines how long (in hours) the virtual tape volume should stay in the disk storage pool (a length of the "flat part" of the curve), absent a critical space shortage. This parameter is restarted on every access (read or write). After the lockdown period expires, the virtual tape volume may be overwritten under the Truncate policy, based on the time it was last accessed.

A third parameter, Residence Priority Decay, determines the rate at which the priority for disk storage pool residence decays (in priority per hour) following the Volume Lockdown Period. This parameter may employ a least-recently-used algorithm. In the face of critical space shortage, the library can recover disk space from virtual volumes whose Volume Lockdown Period has expired, and which has been replicated to other storage pools, and from virtual volumes whose Volume Cool-Off Period has expired but whose lockdown period has not.

Figure 5:
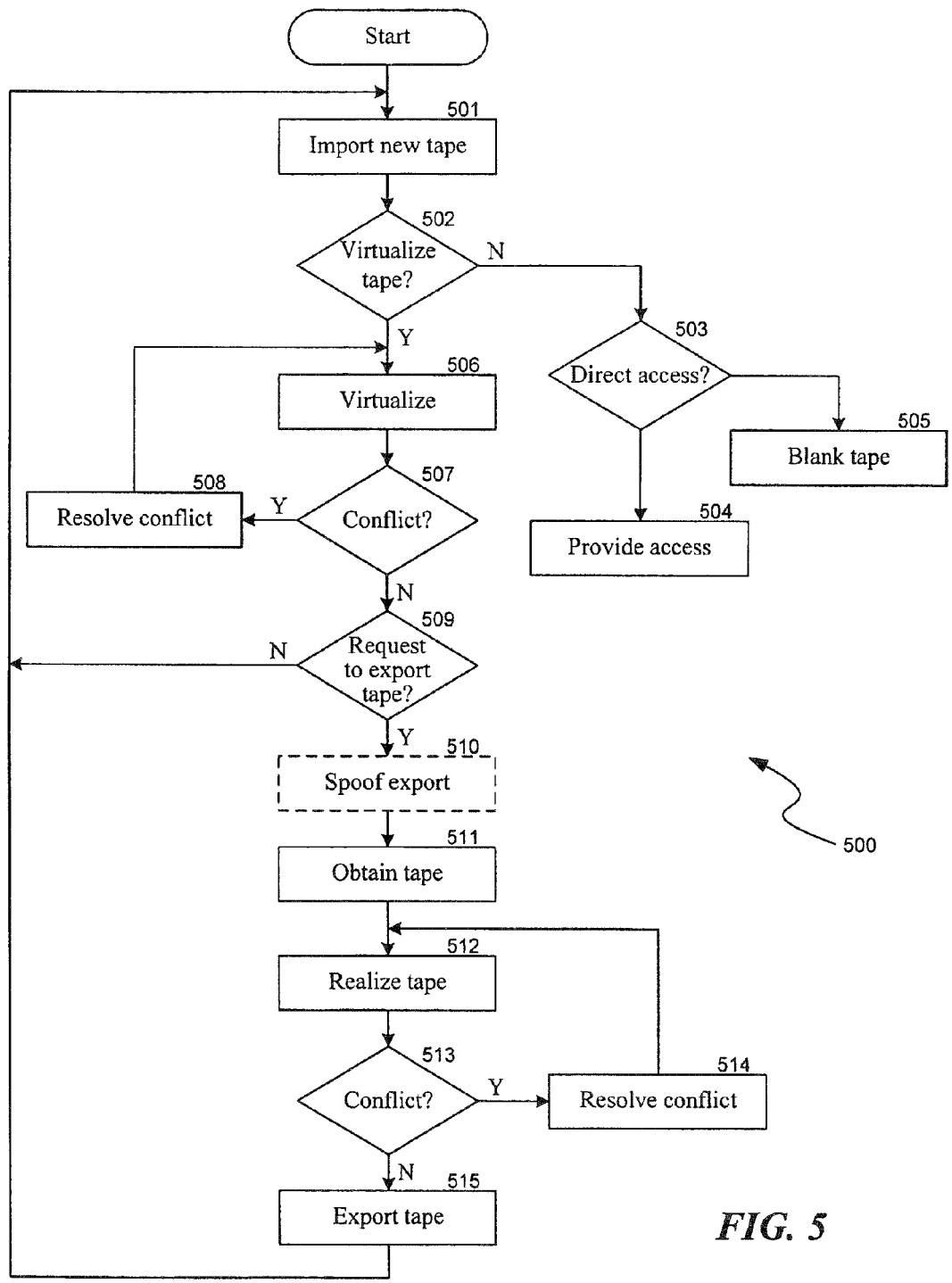
FIG. 5 is a flow chart illustrating the processes of virtualizing and realizing a physical tape cartridge performed by the library.

Referring to FIG. 5, an example of a routine 500 performed by the library management unit 200 for exporting virtual cartridges to create physical cartridges is shown. In general, each of the blocks depicted in FIG. 5 and the other flowcharts can itself include a sequence of operations that need not be described herein. Indeed, one skilled in the relevant art will appreciate that each of the depicted blocks and other functionality steps described below will typically be implemented as several separate routines or subroutines. Those skilled in the relevant art can create source code, microcode, program logic arrays or otherwise implement the routine 500 based on the flowchart of FIG. 5 and the detailed description provided. (The same holds true for implementing other routines described herein). The routine 500 and other routines are preferably stored in non-volatile memory (not shown) that forms part of the library 100, or can be stored in removable media, such as disks, or hardwired or preprogrammed in chips, such as EEPROM semiconductor chips, as noted above.

The library management unit 200 begins the routine 500 by first importing a new tape to the library (block 501). Once introduced to the library, the tape may have one of three states or dispositions: to be a new scratch tape (designated as blank so that it may be written to), a tape to be directly read or written (direct access), or a tape to be virtualized. The three dispositions (blank, direct access, virtualize) are handled via a GUI of the configuration tool 214, either on an individual tape basis, or by defined policy (e.g., by barcode template).

The process of converting a physical tape to a virtual tape on disk is generally referred to herein as "virtualization" or "virtualizing a tape." A virtual tape may be created directly on disk, without there first having been a physical tape. Virtualization specifically only occurs when data is desired from an existing physical tape, such that the retrieval characteristics are best met by first staging the data to disk.

Thus, if the tape is to be virtualized (block 502), then the library mounts the tape in a tape drive, reads the data from the tape to the disk cache 216, and then places the tape in the library (block 506). If the tape is not to be virtualized, but it is designated as direct access (block 503), then the library provides the host with access to that tape (block 504). Otherwise, the tape is designated as blank, so that it may be written to (block 505). A tape that is ascribed to be blank is just stored in the library; a tape that is ascribed to be direct access is also just stored in the library. When the host requests a mount of a tape, the blank and virtual tapes are "mounted" from disk; the direct access tapes are only then mounted in a real drive.

While virtualizing the tape, the library continually determines whether a conflict has arisen (block 507), and if so, resolves the conflict (block 508). The library must be facile enough to switch from virtualizing a tape to providing direct access to it, if a host were to provide a command to access the tape while virtualizing that tape. The library stores the state at which virtualization was suspended, and the location on the disk and tape at which virtualization was suspended. Then, if the host only read data from the tape, the library may leave the tape mounted in the drive and go back to where it left off to continue with the virtualization process. However, if the host's direct access of the tape resulted in a write, then the library starts the virtualization process all over. This is only one example of a conflict. Another example is waiting until the virtualization completes before introducing the now virtual tape into the corresponding virtual library, and providing the host with the appropriate signals that a new tape has appeared The host may request that the tape be exported (block 509). If so, the library may spoof the exporting of the tape before it has in fact been exported (block 510). An example of such a method is as follows. After receiving the request to export the tape (block 509), the library may employ a spoof export routine (block 510). Under this routine, the library simulates the export of a tape by providing appropriate signals to the host, including tape movement commands and signals representing the closing of the door in the export station, followed by making the tape logically disappear from the host's awareness to represent the fact that the tape has left the library. In fact, however, the tape is still being realized, but the host application is satisfied that the tape has been exported. In particular, even before receiving a request to export a tape, the library can pre-stage the data from disk to tape, if the following criteria are met. First, the library determines if the physical tape corresponding to the virtual tape is present in the physical library (i.e., matching barcode label). (The need for the physical tape with the matching barcode label can be optional.) Second, the library determines if the virtual tape is "full enough" based on a user-settable level. Third, the library determines whether it is "allowed" to do perform the early export function (i.e., within a user-settable allowable window). For example, such an early export process will be prohibited certain hours of the day that typically correspond to peak system load times. Finally, the library determines if a physical tape drive is available to mount the tape into to perform the copy.

During the realization process, the library obtains a tape from the library (block 511) and "realizes" the tape (block 512). The process of turning a virtual tape (stored on disk 216) to a physical tape may be referred to as "realization." The process of realizing a virtual tape can take up to two hours, and is required when an application on the host wishes to export a physical tape. The library may employ policies if certain criteria are met so that the system may create a physical tape to anticipate export of it. For example, a given application may periodically request a physical tape (e.g., weekly). The early creation of a physical tape can be done in the background, at non-peak times.

If a conflict arises during realization of a tape (block 513), the library must resolve the conflict (block 514). Such conflicts can arise when, for example, the library receives a mount request or a cancel command. As a result, the library records the state of realizing the tape so that it may then continue realization later (possibly requiring the remounting of that tape cartridge). After the tape has been realized, it may be exported from the library (block 515).

To determine how to dispose of a given tape introduced to the library, the system may employ certain filters to predefine automatically recognized categories for cartridges such as an initial V or D on a barcode label for the cartridge to indicate that the cartridge is to be virtualized on disk, or associated with direct access, respectively, immediately when introduced to the library.

As noted below, backup tapes in the library expire and go back into a pool of blank tapes to be reused under a policy known only to the application running in the host, not to the library. It is a waste of resources to virtualize a tape (which can take two hours), only to discover that the tape is to be overwritten. Therefore, the user is required to provide guidance by specifying the value of the Entry Policy or the tape. The Entry Policy may have a system-wide default, minimizing the level of interaction between system and user.

If the user selects an Entry Policy of "blank", the library may optionally process those tapes to capture an initial file portion prior to making the corresponding virtual tapes available. This process, called "partial virtualization" may allow the host to confirm the identity of the tape without the overhead of fully virtualizing the physical tape. The library begins by storing a portion of the beginning of a new open tape to the disk 216 to create the initial file portion. If the library receives a request from the host for a particular tape, then the library provides only the initial file portion for that tape to the host. If the host reads the tape beyond the content of the stub file, the user will be presented with appropriate signals and status to understand that they have encountered a temporary medium error. The user must then re-specify the Entry Policy (to either "direct access" or "virtualize"). If so configured, the library may act on behalf of the user in this case. The library then provides the host with direct access to it, or provides the virtualization of that tape. If, however, the host provides data to write over the tape, then the library stores the data from the host on the disk 216. The library then simply designates the selected tape as blank, so that it may be put back into the pool of tapes in the library for future use, as explained below.

If a new cartridge introduced to the library is one that has already been exported, then the library associates it with its old virtual library. If not, then the user defines which virtual library the tape will now be associated with. (Even if the library recognizes/knows a previous tape for association with a virtual library, the user may assign it to a different virtual library from the old one.) Further details regarding virtual libraries may be found in the above-referenced patent application. When new blank tapes are introduced to the library (or the library changes a tape's designation to being blank), then the virtual import/export station sends a flag to the host to identify where the new blank tape is. In other words, the import/export station of the virtual library conditions the status of virtual slots within the station to tell an application running on the host that new media is available for use.

In general, backup tapes in the library expire and go back into a pool of blank tapes to be reused. There is a policy for this, but this policy is known only to the application running in the host, not to the library. Therefore, it is a waste of resources to virtualize a tape (i.e., read it from tape back to disk, which can take two hours), only to discover that the data is to be overwritten. Therefore, the library maintains a small, stub file on the disk 216 (e.g., 1 megabyte of a 200 gigabyte tape), and provides this to the host.

As noted above, a tape may be virtualized in that it is written to disk. Under the Truncate policy, that data may be written to a closed tape to free up disk space. However, after the data that has been migrated off to closed tape, and the data has been truncated on disk, the library may receive from the host a mount request for that tape (thus needing to bring the data back to disk). The library does not permit to mounting of a closed tape in a drive and provide direct access to it (i.e., it's in closed format), thus the library must stage the data back to disk for the host to access it. The stub file on disk satisfies the mount request, and allows the library to see what the host is going to do.

Figure 6:
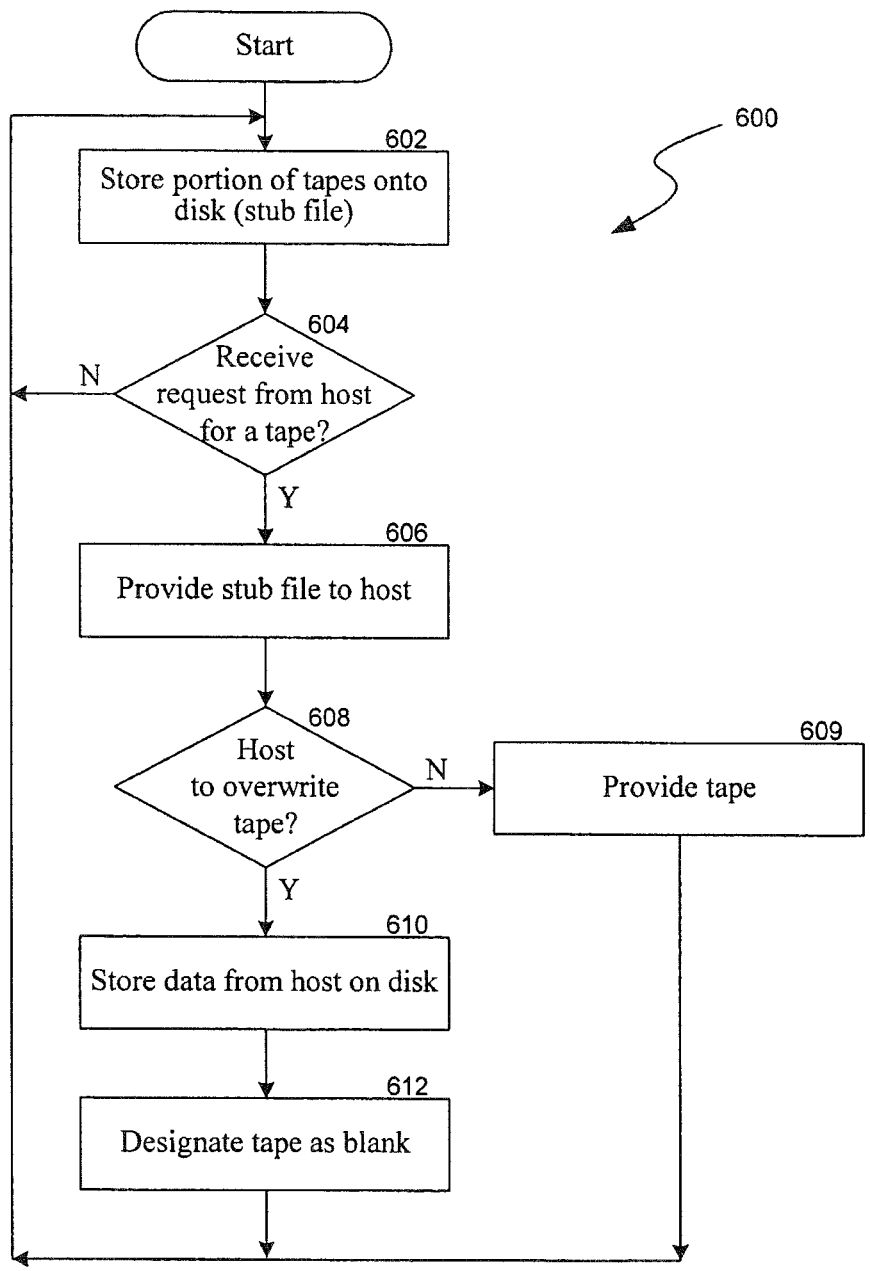
FIG. 6 is a flow chart illustrating steps in providing stub files to a host computer.

FIG. 6 shows an example of this process. A routine 600 running on the library begins by storing or retaining a portion of the beginning of a virtualized tape on the disk 216 as a stub file whenever a virtualized tape or other data is written from disk to closed tape (block 602). The size of the stub file may default to one file system block, but can be adjusted. The initial file portion noted above may be the stub file noted here. If the library receives a request from the host for a particular tape (block 604), then the library provides only the stub file for that tape to the host (block 606). If the library determines that the host is not going to overwrite the tape, then the library reads the virtualized volume from closed tape back onto disk, and provides the host with access to it (block 609), or provides the virtualization of that tape.

If, however, the host provides data to write over the tape, then the library stores the data from the host on the disk 216 (block 610). The library then simply designates the selected tape as blank, so that it may be put back into the pool of tapes in the library for future use (block 612).

To help speed access of a portion of virtual media for backup applications to restore some number of files, the system needs to respond without having to virtualize the entire tape. Rather than implement a costly managed region support for a file system on the library, a scaled-down version of "managed segments" may be implemented by the library, whereby a file is broken into smaller segments to permit retrieval of some segment from the entire tape. The library performs a course blocking of data on a tape, whereby portions of adjacent data are collected and recognized as being together. When the library receives a specific read request from a host, the library can then provide the collection of data that includes specific data to be read, rather than having to virtualize the whole tape.

To know whether a specific segment has been retrieved is accomplished by adding an additional column to a file comparison table or applying a segment mask to extended attributes. For the segment mask, a bit may be set in the mask to correspond to a retrieved segment. When a final segment has been retrieved from the tape, all segment bits are cleared in the event attributes indicate that the file is now entirely stored on disk.

When the library receives data from the host computer to be written to tape, the library receives the data with tape block numbers, writes the data to disk, and creates a table that associates disk byte offsets with tape block numbers. Such a virtualized tape may be a huge disk file of 100 GB. When written to closed tape, the library breaks this huge file into 4 GB segments or subfiles to be written to one or more closed tapes. The library tracks the location and validity of each of these for gigabyte subfiles, with appropriate disk byte offsets. The host may later request access to data associated with a virtualized tape by providing one or more tape block numbers. However, such data may no longer be on disk, but have been stored on closed tape. Therefore, the library converts the tape block numbers to disk byte offsets, identifies the one or more subfiles or segments associated therewith, and simply provides the one or more subfiles to the host, where these subfiles include the requested data (associated with the tape block numbers).

At times, a cartridge is to be exported from one library to another. With a physical media library, to transfer media from one library to another, the media must first be physically exported from the first library and then imported to the second. With a virtual or logical library, a brute force method would be to realize a virtualized tape, then physically export it from one physical library to another, and then virtualize it again on the second library. A somewhat improved solution is to simply write the virtualized tape from one library to another. However, a greatly improved solution is to simply change a pointer so that a virtualized volume is now associated with a new virtual library.

Figure 7:
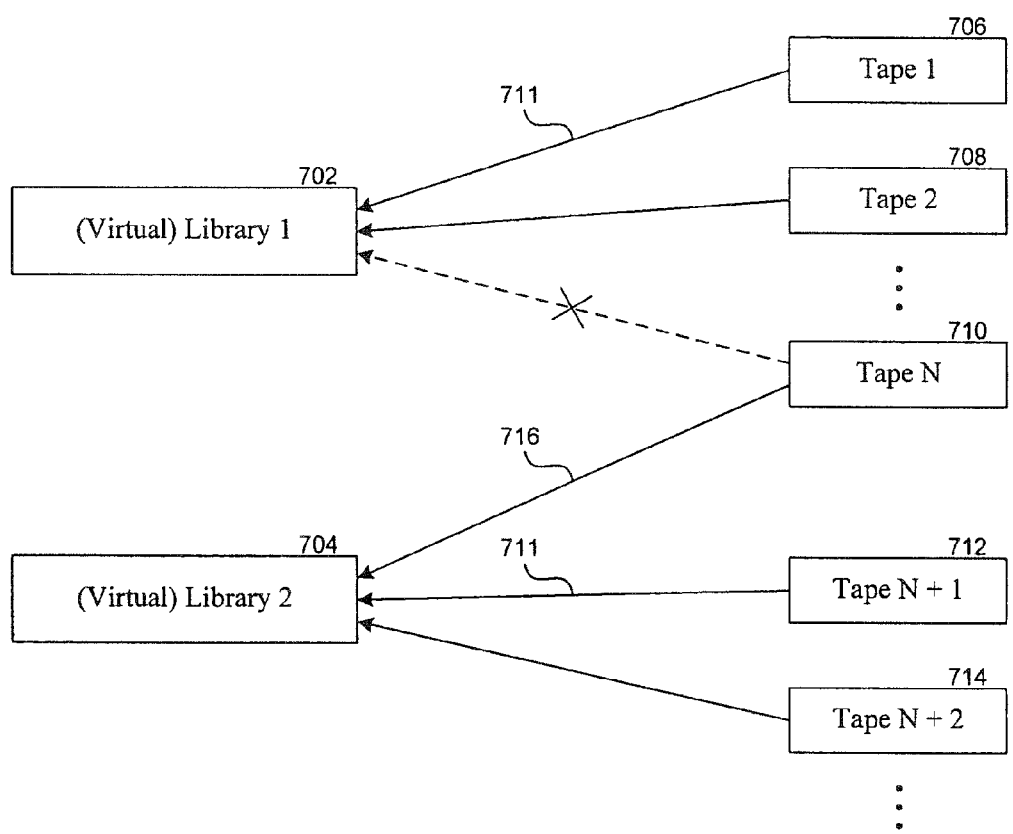
FIG. 7 is a block diagram showing an association of virtual tapes to virtual libraries.

FIG. 7 shows an example of this. The first virtual library 702 is associated with multiple tapes, such as tapes 706, 708 and 710. Such an association is represented by pointers 711. A second virtual library 704 is associated with numerous tapes, including tapes 712 and 714. To logically or virtually export the tape 710 from the first virtual library to the second, the pointer from tape 710 is simply redirected so that it now points to the second virtual library (represented by pointer 716).

This process also includes having the library provide the appropriate signals back to the host(s) to indicate tapes leaving the first virtual library via the import/export station, and the tapes appearing in the second virtual library via the import/export station (to simulate someone actually moving the tapes). The request for such a movement could be done via a single user interface at the virtual library level, or through a series of requests from the hosts attached to the virtual libraries (e.g., export request to the first virtual library followed by an import request to the second). This can be extended to include electronic transfer of virtual media from one virtual system to another, with appropriate cooperation between such systems.

Conclusion

Unless the context clearly requires otherwise, throughout the Detailed Description, the words "comprise," "comprising," and the like are to be construed in an inclusive sense as opposed to an exclusive or exhaustive sense; that is to say, in the sense of "including, but not limited to." In the Detailed Description, words using the singular or plural number also include the plural or singular number respectively. Additionally, the words "herein," "above," "below" and words of similar import refer to this application as a whole and not to any particular portions of this application. When the claims use the word "or" in reference to a list of two or more items, that word covers all of the following interpretations of the word: any of the items in the list, all of the items in the list and any combination of the items in the list.

The Detailed Description of embodiments of the invention are not intended to be exhaustive or to limit the invention to the precise form disclosed. While specific embodiments of, and examples for, the invention are described for illustrative purposes, various equivalent modifications are possible within the scope of the invention, as those skilled in the relevant art will recognize. For example, while processes or blocks are presented in a given order, alternative embodiments may perform routines having blocks in a different order, and some blocks may be deleted, moved, added, subdivided, combined, and/or modified. Each of the blocks or functions may be implemented in a variety of different ways. Also, while the blocks are shown as being performed in series, the blocks may instead be performed in parallel, or may be performed at different times.

The teachings of the invention provided herein can be applied to other systems, not necessarily the specific system described herein. These and other changes can be made to the invention in light of the Detailed Description. The elements and acts of the various embodiments described can be combined to provide further embodiments.

Further details regarding data storage libraries and associated systems may be found in the above US applications. All of the referenced patents, applications and other references, including any that may be listed in accompanying filing papers, are incorporated herein by reference. Aspects of the invention can be modified, if necessary, to employ the systems, functions and concepts of the various references described to provide yet further embodiments of the invention.

These and other changes can be made to the invention in light of the detailed description. While the description details certain embodiments of the invention and describes the best mode contemplated, no matter how detailed the appears in text, the invention can be practiced in many ways. Details of the library management unit may vary considerably in its implementation details, while still be encompassed by the invention disclosed herein. As noted above, particular terminology used when describing certain features or aspects of the invention should not be taken to imply that the terminology is being re-defined herein and restricted to any specific characteristics, features or aspects of the invention with which that terminology is associated. In general, the terms used in the following claims should not be construed to limit the invention to the specific embodiments disclosed in the specification, unless the Detailed Description explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed is:

1. A method for managing data in a data storage library having first and second types of data storage that have different qualities of service, that have different prices per unit of data storage, and that are reserved for use by the data storage library, the first type of data storage having a higher quality of service and a higher price per unit of data storage than the second type of data storage, the data storage library being configured to exchange data with at least one external computer, the method comprising:

storing data files from the external computer to the first type of data storage;

upon occurrence of a data storage condition on the first type of data storage, identifying a subset of the data files on the first type of data storage; and storing at least the subset of data files from the first type of data storage to the second type of data storage; and freeing up storage space associated with the subset of files on the first type of data storage; wherein the data storage condition being that a storage capacity of the first type of data storage has been exceeded, where identifying the subset of the data files on the first type of data storage comprises creating a table identifying candidate data files on the first type of data storage to be transferred to the second type of data storage, and where storing at least the subset of data files includes storing, to the second type of data storage, data files on the table that are least recently used by the external computer.

2. The method of claim 1, further comprising categorizing a value of each of the data files, wherein categories include: a data file to always stay on the first type of data storage, a data file to stay on the first type of data storage for a predetermined time period, and a data file to be substantially immediately transferred to the second type of data storage and identified for being overwritten on the first type of data storage.

3. The method of claim 1, further comprising prioritizing each of the data files, wherein data files with a lower priority are identified for being overwritten or removed from the first type of data storage before data files of a higher priority.

4. The method of claim 1, further comprising prioritizing each of the data files, wherein each of the data files is assigned:

an initial priority value, a first priority value associated with a first time period during which the data file remains on the first type of data storage before being identified for being overwritten or removed from the first type of data storage, a second priority value associated with a second time period indicating how long the data file should stay on the first type of data storage, and a priority rate that indicates a rate at which the initial priority decays following the second priority value.

5. The method of claim 1, further comprising prioritizing each of the data files, wherein data files with a lower priority are identified for being overwritten or removed from the first type of data storage before data files of a higher priority, and wherein priorities associated with at least some data files change over time.

6. The method of claim 1 wherein the storing occurs before the monitoring, and wherein the storing includes copying, from the first type of data storage, the data files from the external computer to the second type of data storage.

\* \* \* \* \*